Nov. 22, 1955  W. H. RITCHIE  2,724,764
ROTATING BAKING OVEN
Filed Sept. 21, 1953
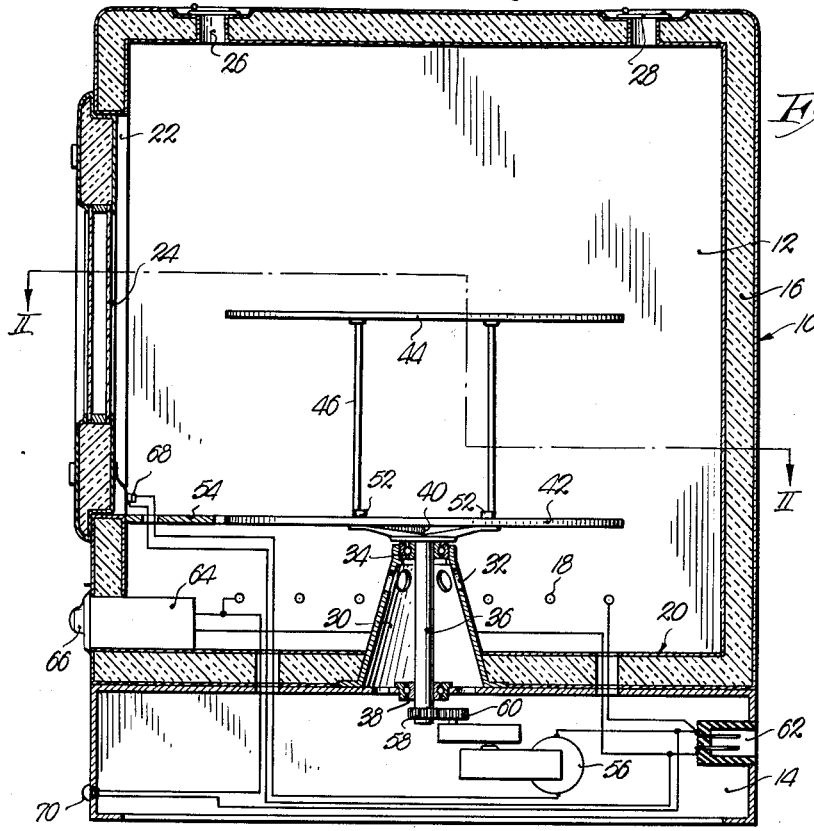
Fig. 1.
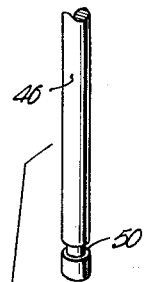
Fig. 3.
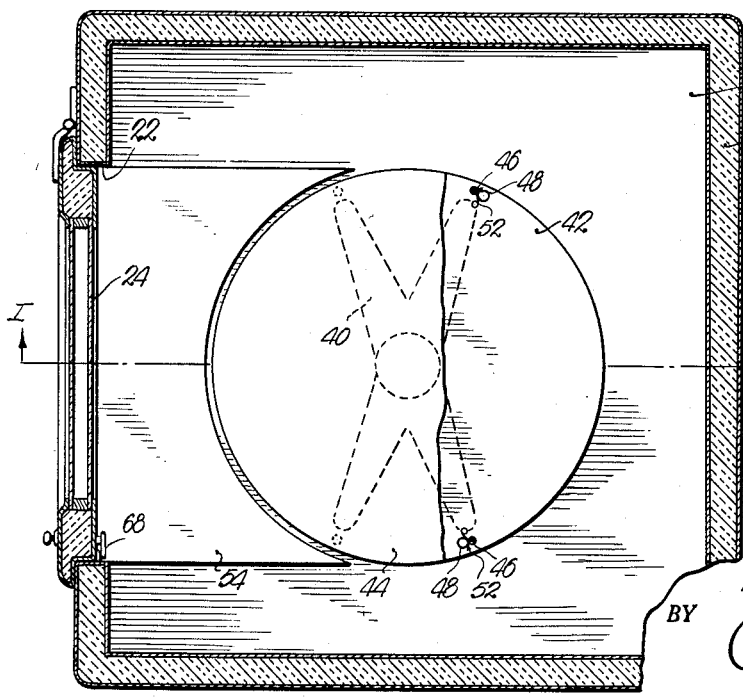
Fig. 2.
INVENTOR.
Warren H. Ritchie
BY
ATTORNEY.

_United States Patent Office_

2,724,764
Patented Nov. 22, 1955

2,724,764

ROTATING BAKING OVEN

Warren H. Ritchie, Omaha, Nebr.

Application September 21, 1953, Serial No. 381,215

1 Claim. (Cl. 219—35)

This invention relates to improvements in home appliances and particularly in cooking or baking devices, the primary object being to provide an oven having as a part thereof, a rotatable support in the nature of a number of superimposed plates, all for the purpose of providing an even distribution of heat through the cake or other dish being prepared, and therefore, an even baking thereof so as to improve upon the appearance of the finished product and to improve upon its palatability.

It is the most important object of the present invention to provide an oven including a heating compartment within which is provided a number of horizontal plates that are in turn mounted on a vertical spindle operably coupled with a prime mover preferably located beneath the compartment, all in combination with the necessary controls, not only for the rotating mechanism, but for heater means disposed within the compartment and beneath the lowermost plate.

Other objects include the way in which a chamber is provided in the cabinet beneath the heating compartment for receiving the prime mover; the way in which control units govern not only the temperature of the heating element, but energize the prime mover for the rotatable plates; the way in which an access door is provided for the oven, together with switch means which automatically close upon shutting of the door so as to energize the aforementioned prime mover; and additional objects including important details of construction, all of which will be made clear as the following specification progresses.

In the drawing:

Figure 1 is a vertical, cross-sectional view taken on line I—I of Fig. 2.

Fig. 2 is a horizontal, cross-sectional view taken on irregular line II—II of Fig. 1; and Fig. 3 is a fragmentary, exploded view illustrating the manner of interconnecting the rotatable supporting plates of the heating compartment.

A cabinet, broadly designated by the numeral 10, is illustrated in Figs. 1 and 2 of the drawing, formed in a suitable manner to provide a heating or baking compartment 12 and a hollow chamber 14 therebelow. That part of the cabinet 10 forming the compartment 12, is preferably of double-wall construction and insulated as at 16 to retain the heat developed therein by heating means 18 within compartment 12 directly above bottom wall 20 thereof.

The heating means 18 is preferably in the nature of an electric "Calrod" element and is mounted within the compartment 12 in any suitable manner. Cabinet 10 is additionally provided with an access opening 22 in one side thereof communicating with the compartment 12 and normally closed by an insulated door 24. Vent openings 26 at the top of the compartment 12 are opened through the medium of swingable plates 28.

A hollow, frusto-conical support 30, carried by the bottom wall 20, extends upwardly into the compartment 12 and has a plurality of vent openings 32 near its uppermost end. A bearing 34, carried by the support 30 at its uppermost end, rotatably receives a vertical spindle 36 that also passes through a bearing 38 and terminates within the chamber 14. A spider 40 on the uppermost end of the spindle 36 resting upon the bearing 34, has a plate 42 secured thereto which in turn supports an uppermost plate 44. The plates 42 and 44 are preferably circular and plate 44 has a plurality of elongated legs 46 depending therefrom.

A keyhole opening 48 is provided in the plate 42 for each leg 46 respectively adjacent the periphery thereof and an annular groove 50 formed in each of the legs 46 at their lowermost ends, adapts the same for fitting within the openings 48. A leaf spring 52 is carried by the plate 42 adjacent each opening 48 respectively to yieldably hold the legs 46 within the openings 48. It is seen that plate 44 may be easily removed from the plate 42 simply by rotating the same against the action of springs 52 and thereupon raising the plate 44 and the legs 46 so that the same may be removed from the compartment 12 through the opening 22. A shelf 54 coincident with the lowermost edge of the access opening 22 and flush with the plate 42, aids in placing cakes or other dishes upon the plate 42.

An electrical prime mover such as a rotor coil 56 is suitably mounted within the chamber 14 operably coupled with the spindle 36 through the medium of intermeshing gears 58 and 60.

The oven may be operably coupled with a suitable source of electrical energy not shown, by means of a plug 62 that is connected by wiring as illustrated in Fig. 1, not only with the heating element 18, but with the prime mover 56. The heating element 18 is in turn controlled by a thermostatic unit 64 mounted in compartment 12 and having a manual control knob 66 for controlling the temperature of the unit 18.

A door switch 68 and a pilot lamp 70 are coupled so that when the door 24 is closed to in turn close the switch 68, the prime mover 56 will immediately be energized and the plates 42 and 44 caused to rotate through the gears 58 and 60 and the spindle 36, such operation being indicated by lamp 70.

Having thus described the invention what is claimed as new and desired to be secured by Letters Patent is:

In an oven including a cabinet having a horizontal partition between the wall to form an upper heating compartment and a lower chamber, a rotatable baking shelf comprising an upright, hollow, vented, frusto-conical support provided with an uppermost and a lowermost end portion and adapted for mounting on the partition in said heating compartment; a bearing mounted in each of said end portions respectively; a vertical spindle rotatably mounted in the bearings; a spider rigidly secured to the uppermost end of the spindle for rotation therewith in a substantially horizontal plane and resting on the uppermost bearing; a lowermost, horizontal, article-supporting, circular plate secured to the spider, said plate having a plurality of keyhole openings adjacent the periphery thereof; an uppermost, horizontal, article-supporting circular plate having a number of legs depending therefrom at the periphery thereof, each of said legs having an annular groove adjacent the lowermost end thereof, each of said grooves being releasably interlocked with the lowermost plate in a corresponding opening, and a leaf spring mounted on said lowermost plate adjacent each opening respectively, said springs engaging a proximal leg when the latter is in the opening.

References Cited in the file of this patent

UNITED STATES PATENTS

| | | |
|---|---|---|
| 844,071 | Weston | Feb. 12, 1907 |
| 1,535,579 | Colby | Apr. 28, 1925 |
| 1,994,629 | Arkema | Mar. 19, 1935 |
| 2,314,248 | Rutledge | Mar. 16, 1943 |
| 2,639,042 | Lambert | May 19, 1953 |